T. J. ALCOTT.

WATER-WHEEL.

No. 7,241. Reissued July 25, 1876.

Witnesses:

Lewis S. Brown,

A. P. Grant.

Inventor:

Thomas J. Alcott.

by John A. Giedershein

Attorney.

N. PETERS, PHOTO-LITHOGRAPHER, WASHINGTON, D. C.

UNITED STATES PATENT OFFICE.

THOMAS J. ALCOTT, OF MOUNT HOLLY, NEW JERSEY.

IMPROVEMENT IN WATER-WHEELS.

Specification forming part of Letters Patent No. 133,287, dated November 26, 1872; reissue No. 7,241, dated July 25, 1876; application filed May 27, 1876.

*To all whom it may concern:*

Be it known that I, THOMAS J. ALCOTT, of Mount Holly, in the county of Burlington and State of New Jersey, have invented a new and useful Improvement in Water-Wheels; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
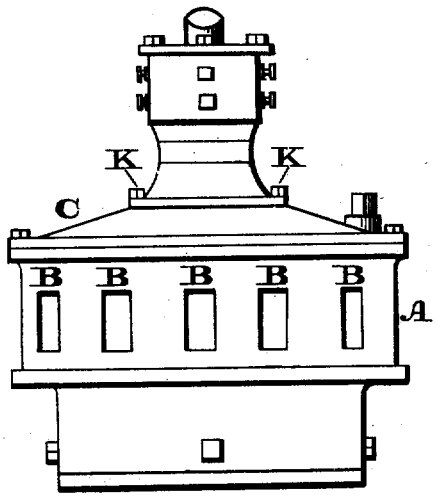
Figure 2:
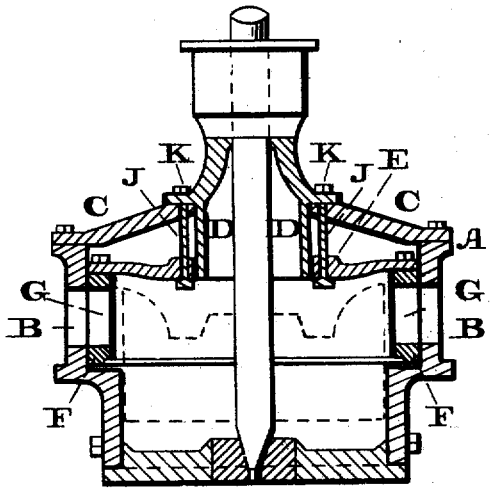
Figure 3:
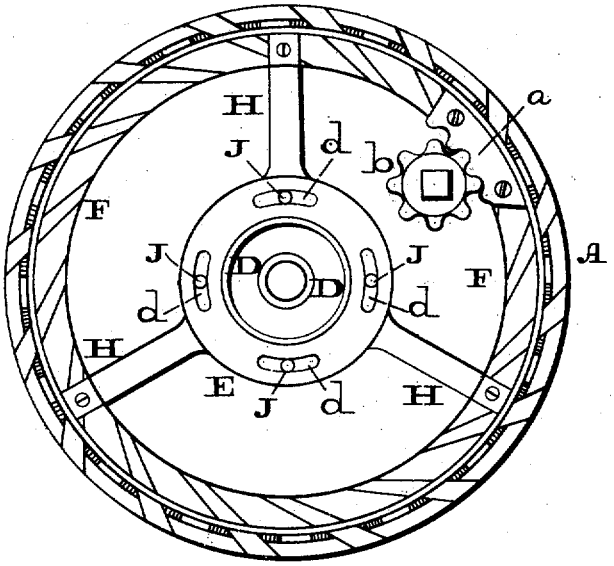

Figure 1 is a side elevation, showing the outside case. Fig. 2 is a transverse vertical section of said case and the inner adjustable register or chute. Fig. 3 is a horizontal section thereof.

Similar letters of reference indicate corresponding parts in the several figures.

My invention consists of a water-wheel case having under its crown-plate a depending sleeve, forming a central bearing for the hub of the inner register, whereby friction will be removed from the outer periphery of said inner register.

It also consists of a register or chute vertically adjustable in the wheel-case, whereby friction may be removed from the bottom of the register.

Referring to the drawings, A represents the outer case, and B the openings or chutes thereof. From the under side of the crown-plate C of the case A there depends a sleeve, D, which projects into the case A, and forms the bearing for the hub or plate E of the inner register F, consisting of a rotating band or cylinder, having openings or chutes G, corresponding with the openings or chutes B of the case A, said register being connected to the hub D by arms H, and receiving rotary motions by means of a rack and pinion, *a b*, whereby, by proper operation of the register, the openings B of the case A may be entirely opened, so as to admit full head of water to the wheel, partially opened, so as to diminish the flow of water thereto, or entirely closed, so as to entirely shut off the water, the hub of the register having its bearing on the sleeve D.

In order to remove friction from the bottom of the inner register, I make the latter vertically adjustable. In the present case I employ vertical bolts J, which pass through the hub D, with their heads thereunder and through the crown-plate C, their upper or outer ends having nuts K.

It is evident that by tightening or loosening the nuts K the bolts J will be raised or lowered, thus affecting the position of the register, provision being thereby made for adjusting the register for the purpose stated, and also to properly set the register in the case A and provide a snug joint between the register and case.

The openings in the hub through which the bolts J are passed are in the form of curved slots, as at *d*, so that the bolts do not prevent the rotation of the hub.

Having thus described my invention, what I claim as new, and desire to secure by Letters Patent, is—

1. The water-wheel case having under its crown-plate a depending sleeve, forming a central bearing for the hub of the inner register or chute, substantially as and for the purpose set forth.

2. The water-wheel case having an inner register or chute vertically adjustable therein, for the purpose set forth.

THOS. J. ALCOTT.

Witnesses:

JOHN A. WIEDERSHEIM,
JNO. A. BELL.